(12) United States Patent
Hermann et al.

(10) Patent No.: US 7,099,938 B2
(45) Date of Patent: Aug. 29, 2006

(54) METHOD, COMPUTER SYSTEM, AND COMPUTER PROGRAM PRODUCT FOR MONITORING SERVICES OF AN INFORMATION TECHNOLOGY ENVIRONMENT

(75) Inventors: Alfred Hermann, Weil der Stadt (DE); Frank Vosseler, Altdorf (DE); Bernd Gutjahr, Ostelsheim (DE); Peter Klotz, Fellbach (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 672 days.

(21) Appl. No.: 09/816,940

(22) Filed: Mar. 23, 2001

(65) Prior Publication Data

US 2002/0138638 A1    Sep. 26, 2002

(51) Int. Cl.
  *G06F 15/173* (2006.01)
(52) U.S. Cl. .................................... 709/224
(58) Field of Classification Search ............... 709/224, 709/223, 202, 203, 230
  See application file for complete search history.

(56) References Cited

U.S. PATENT DOCUMENTS

| | | | |
|---|---|---|---|
| 6,347,374 B1* | 2/2002 | Drake et al. ............... | 713/200 |
| 6,456,306 B1* | 9/2002 | Chin et al. .................. | 345/810 |
| 6,460,070 B1* | 10/2002 | Turek et al. ................. | 709/202 |
| 6,681,232 B1* | 1/2004 | Sistanizadeh et al. .... | 707/104.1 |
| 6,732,118 B1* | 5/2004 | Hermann et al. ............ | 707/10 |
| 6,748,432 B1* | 6/2004 | Du et al. ...................... | 709/224 |
| 2004/0030778 A1* | 2/2004 | Kronenberg et al. ........ | 709/224 |

FOREIGN PATENT DOCUMENTS

WO    WO 00/72183    5/2000

OTHER PUBLICATIONS

Stone, Brad et al., UNIX Fault Management: A Guide for System Administration (Prentice Hall PTR, 1999).*
Stone, Brad et al., UNIX Fault Management: A Guide for System Administration, (Prentice Hall PTR, © 1999).*
Lewis, L.: "Spectrum Service Level Management Definition, Offerings and Strategy" Cabletron Technical Note, Mar. 30, 1998, English.
Kubo, K, et al.: "A Method of Extracting Management Information ofr Service Management" NTT Review, Mar. 1, 1998, English.
Lewis, L. et al.: "Incorporating Business Process Management into Network and Systems Management" Proceedings. ISA DS, International Symposium on Autonomus Decentralized Systems, Apr. 4, 1997, English.

(Continued)

*Primary Examiner*—Doug Hutton

(57) ABSTRACT

The invention is directed to a method for monitoring services of an information technology (IT) environment. The method comprises evaluating, by a status engine, the status of a service (superordinate service) that depends on at least one of the statuses of one or more other services (subordinate services) and one or more messages. The messages come from services of the IT environment and affect the status of the superordinate service. The evaluation is performed according to one or more rules. The rules include at least one of:

a) a rule that is based on additional attributes of the service other than the status;
  b) a rule that ignores subordinate services;
  c) a rule that is defined by a user on the basis of at least one of i) logical and ii) arithmetical operations of the status of subordinate services or of said messages or of said attributes; and
  d) a rule that is programmed individually by a user.

The invention is also directed to a corresponding computer system and a corresponding computer program product.

21 Claims, 8 Drawing Sheets

OTHER PUBLICATIONS

European Search Report of European Patent Application No. 01 107 261.8 dated Sep. 21, 2001, English.

VantagePoint for Windows, Concepts Guide, HP Openview, 2000, pp. 1-79, English.

* cited by examiner

METHOD, COMPUTER SYSTEM, AND COMPUTER PROGRAM PRODUCT FOR MONITORING SERVICES OF AN INFORMATION TECHNOLOGY ENVIRONMENT

FIELD OF THE INVENTION

The present invention relates generally to the monitoring of information technology (IT) environments, and more particularly to a method, a computer system, and a computer program product for monitoring the status of services of an IT environment.

BACKGROUND OF THE INVENTION

Nowadays, as information systems become ubiquitous, and companies and organizations of all sectors become severely dependent on their computing network and IT services, the demand for tools for monitoring IT environments increases rapidly. The class of sensitive IT services includes online transaction processing, electronic commerce, Internet/World Wide Web, data warehousing, telecommunication switches, and server applications that generally run 24 hours a day. In addition, almost all internal business processes such as electronic communication or information retrieval rely on a properly functioning IT network. These servers must run perpetually, providing a service to the employees and clients, and therefore demand a high availability as the cost of any outage can be substantial. While it is essential for companies to maintain the health of their IT services, the underlying IT environment becomes more and more complex and thus susceptible to failures. Not only is the number of computers within an IT network growing rapidly, but also many services are distributed over the network and depend thus on several network components. In large IT networks those dependencies make it impossible for administrators and operators to keep an overview over the performance of the IT services without an appropriate service management tool.

Operators of complex services that are distributed over different platforms within an IT network are often confronted with a huge number of messages reporting the status and errors of nodes of the IT network. Due to the number of network components and the complex interactions between those components it is difficult for the operator to resolve the dependencies of the generated error messages and to track down the origin of the problem. Moreover, it is even difficult to detect important error messages and distinguish them from less important messages so that there is a risk that the operator overlooks relevant messages in the stream of messages.

A service management tool is an IT solution for managing the availability and performance of IT-based business services from the end user's perspective. Those tools are able to detect and evaluate the health and availability of a service or application, recognize and warn the operator when a problem is about to occur and respond automatically to poor performance. They allow the user to manage individual services and all elements that depend on these services. They enable the user to build management models of the IT environment that represent the service elements and the relationships and dependencies between them. One feature of those service management tools is therefore to provide the status of any of those services in the light of the dependencies amongst them. The Hewlett-Packard product HP Open-View VantagePoint for Windows™ is such a service management system that runs under Windows™ but is also able to manage heterogeneous IT environments independent of the platform.

Service management tools are aiming to support administrators and operators of complex network-based IT services. In general, the task of administrators is to set up the management model, to configure it and maintain the model configuration, and to define failures and suppression criteria in order to reduce the information that is sent to operators. The operators' primary function is to monitor the status of a service and to troubleshoot and respond to problems using the information provided by the service management tool.

Service management tools are usually built on common network software and common console software such as the Microsoft Management Console (MMC) for the Windows™ environment which is a common console framework for IT management applications. MMC provides a basic framework for the management of IT environments. The invention, however, is intended to improve the possibilities of monitoring IT environments in view of the growing complexity of those environments.

SUMMARY OF THE INVENTION

A method for monitoring services of an information technology (IT) environment. The method comprises evaluating, by a status engine, the status of a service (superordinate service) that depends on at least one of the statuses of one or more other services (subordinate services) and one or more messages coming from services of the IT environment and affecting the status of the superordinate service. The evaluation is done according to one or more rules. According to one aspect (aspect a), a rule is based on additional attributes of the service other than the status. According to another aspect (aspect b), a rule ignores subordinate services. According to another aspect (aspect c), a rule is defined by a user on the basis of at least one of i) logical and ii) arithmetical combinations of the status of subordinate services or of said messages or of said attributes. According to still another aspect (aspect d), a rule is programmed individually by a user.

The invention also relates to a computer system for monitoring services of an IT environment, comprising:
a status engine for evaluating the status of the services;
a user interface for configuring rules; and
a graphical display for visualizing monitoring results.

The status engine is programmed so as to calculate the status of the service (superordinate service) that depends on at least one of the statuses of one or more other services (subordinate services) and one or more messages coming from services of the IT environment and affecting the status of the superordinate service. The calculation is done according to one or more rules. According to one aspect (aspect a) a rule is based on additional attributes of the service other than the status. According to another aspect (aspect b) a rule ignores subordinate services. According to still another aspect (aspect c) a rule is defined by a user on the basis of at least one of i) logical and ii) arithmetical combinations of the status of subordinate services or of said messages or of said attributes. According to still another aspect, a rule (aspect d) is programmed individually by a user.

The invention also relates to a computer program product including program code for carrying out a method for monitoring services of an information technology (IT) environment, when executed on a computer system. The method comprises evaluating, by a status engine, the status of a service (superordinate service) that depends on at least one of the statuses of one or more other services (subordinate services) and one or more messages coming from services of the IT environment and affecting the status of the superordinate service. The evaluation is done according to one or more rules. According to one aspect (aspect a), a rule is based on additional attributes of the service other than the status. According to another aspect (aspect b), a rule ignores subordinate services. According to another aspect (aspect c), a rule is defined by a user on the basis of at least one of i) logical and ii) arithmetical combinations of the status of subordinate services or of said messages or of said attributes. According to still another aspect (aspect d), a rule is programmed individually by a user.

Other features are inherent in the disclosed method and computer system or will become apparent to those skilled in the art from the following detailed description of embodiments and the accompanying drawings.

DETAILED DESCRIPTION OF THE PREFERRED EMBODIMENTS

Figure 1:
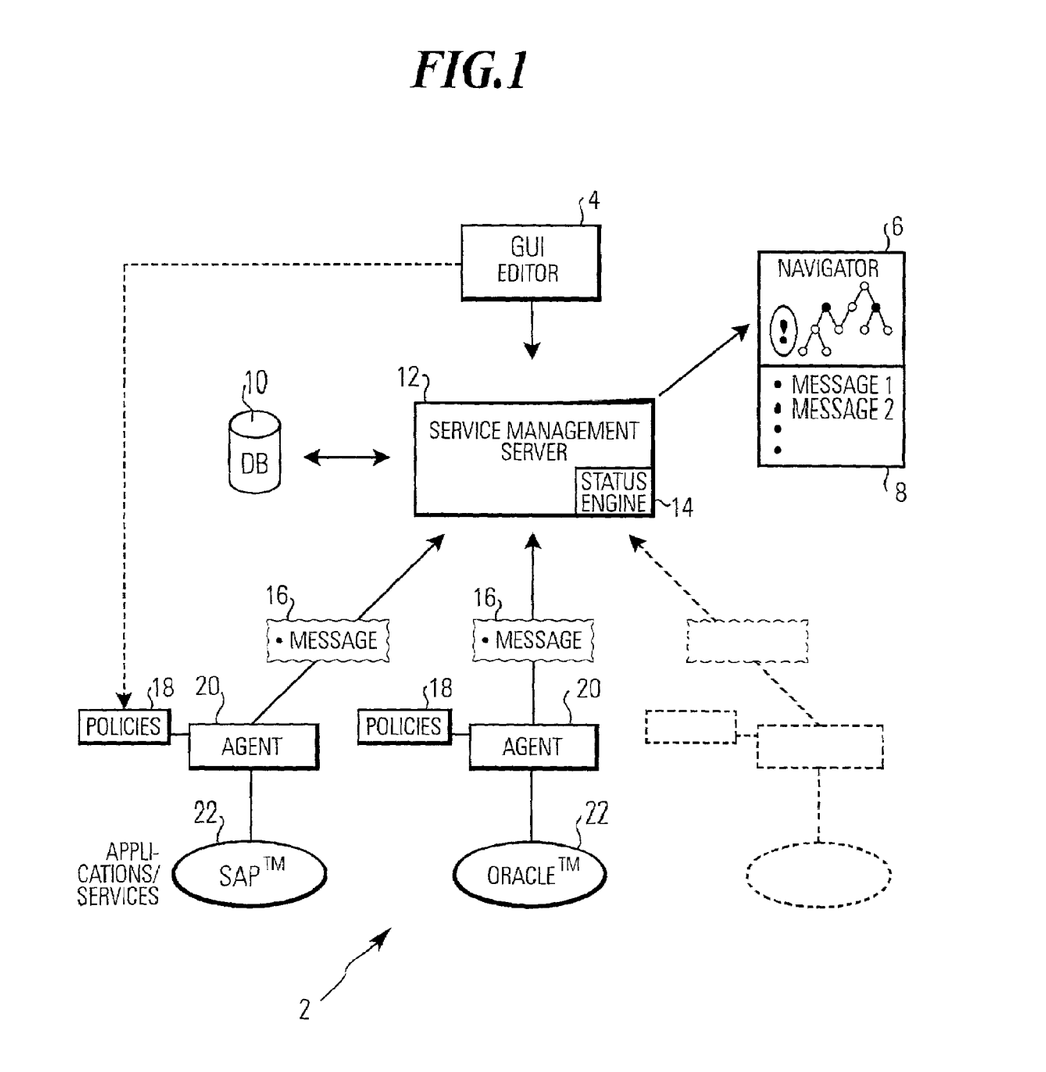
FIG. 1 shows a high-level architecture of a service management system.

The general high-level architecture of a service management system is depicted in FIG. 1. Before proceeding further with the description, however, a few items of the preferred embodiments will be discussed.

In general, the purpose of an IT network of a company is to offer services to their employees and customers. Services for employees, for instance, are a facility for exchanging electronic mails, or for accessing electronic data bases. The company's web page is an example of an IT service for customers. Services in this context range from low-level network components such as routers or switches to software applications such as Microsoft™ Office or an Oracle™ database, and from hardware-based services such as printing or displaying capabilities, up to abstract high-level services such as the marketing department that itself uses various other IT services. These different kinds of services comprise one or more hardware or software components within the computing environment. Most services are, in fact, an aggregation of applications and computer systems. All these services and their individual components represent nodes within the network and can be represented as elements in a service management model. Thus the term IT environment refers in particular to IT networks, but also to applications, services, software components and network elements.

Most services are not stand-alone applications but require the availability of other services. For instance, the high-level service Microsoft™ Office for a desktop computer requires that the Microsoft™ applications, such as Excel, Access, Word, etc., are running, an e-mail service and a printing capability are available, whereas the printing capability again may rely on various printers and network components. Therefore, the term "superordinate" service refers to a service that depends on one or more "subordinate" services. The subordinate services themselves may again depend on other services. The latter would thus be the superordinate service of other subordinate services on the next level. In the above example, Microsoft™ Office would be the superordinate service depending, among others, on the subordinate service "printing capability" which would itself be the superordinate service of the subordinate services of individual printers.

The term "message" refers to a structured notification that is generated as a result of an event. Typically, an event represents a fault or a problem in operation, but it can also be a change in application system network or service status. Messages are sent to the service management server reporting basically the status of the service that has triggered the event. For example, when the printer's paper tray is empty, the printer's status changes. This results in an event that creates a message notifying the service management server of the printer's new status.

The status of a service can take different severity levels. The severity level indicates the impact of events or messages associated with a service on the performance of the service. Typical severities of services or messages associated with services are "normal", "warning", "minor", "major", or "critical".

Since the availability and performance of a superordinate service depends on subordinate services, the status of the superordinate service is also a function of the status of the subordinate services. So-called "rules" define how the statuses of the subordinate services contribute to the status of the superordinate service. In some cases it is difficult to derive the proper status of the superordinate service only from the statuses of the subordinate services and corresponding messages concerning the superordinate service. Therefore, in the preferred embodiments of aspect a) of the invention, the rules are extended so that additional attributes for both the superordinate services and the subordinate services are taken into account for the calculation of the status of the superordinate service. Such an additional attribute might be, for example, a parameter indicating the usage of a storage disk. This parameter might significantly affect the status of a superordinate service that relies on free disk space of that storage disk.

In other cases, it is advantageous to ignore the status of certain subordinate services for the purpose of calculating the status of a superordinate service. To this end, in the preferred embodiments of aspect b) of the invention, rules can be supplied that exclude specific subordinate services from the status calculation. For example, services that are known to be in maintenance can be excluded from the status calculation as the status of messages relating to this service might not reflect its real status.

Rules for the calculation of the status of a superordinate service take into account either the status of subordinate services, messages reporting the status of the superordinate service or additional attributes other than the status, or any combination of those. In the preferred embodiments of aspect c) of the invention, logical or arithmetical operations or combinations of both on the basis of these parameters can be defined by the user in order to determine the status of the superordinate service. This is particularly useful for giving, for example, an individual subordinate service more importance than the other contributing subordinate services, for imposing thresholds on certain attributes, or for setting values of different attributes in relation to each other. The logical and arithmetical operations also comprises comparison operations and condition statements.

Most flexibility can be achieved by allowing the user to use a complete syntax of a programming language to define rules for the calculation of the status of a superordinate service. In the preferred embodiments of aspect d) of the invention, therefore, the rules can be programmed individually by the user.

The above rules are applied in addition to simpler rules from the state of the art, in which, for example, the status of the subordinate service with the highest severity level is taken as the status of the superordinate service.

As discussed above, it is advantageous to realize each of the aspects a) to d) individually. In preferred embodiments, also any combinations of these aspects are implemented, for instance aspects a) and c) of the invention together. However, most preferably all aspects a), b), c), and d) of the invention are included in the service management system. Even though with aspect d) the preceding aspects a) to c) can be implemented, it is often more convenient for the user to make use of the predefined functionality of the aspects a) to c) in addition to d).

The status of a subordinate service, when propagated to the superordinate service and further to the next level and so forth, might gain or lose importance for the status of the following level. Therefore the status of services can be individually manipulated when they are applied in the status calculation of the next higher level using so-called status propagation rules. These rules usually increase or decrease the severity of a status of a service or leave the status unchanged during the propagation from one level to the next higher level. The aspects a) to d) comprise a different type of rules, as they use the already manipulated statuses of subordinate services or messages for determining the status of the superordinate service.

The preferred embodiments therefore distinguish between status propagation rules that have as input only one parameter, namely the status of one subordinate service, and status calculation rules according to aspect a) to d) that can have several parameters as input, namely the status of subordinate services, messages reporting a status, or additional attributes. Regarding aspect c) and d), the calculation of the superordinate service depends most preferably on all three different types of input data: statuses of subordinate services, messages affecting the superordinate service and additional attributes of both subordinate and superordinate services.

As already mentioned, the possible values that the status of the services can take are for example "normal", "warning", "minor", "major", "critical". In the preferred embodiments of aspect a) the additional attributes can take values different from those of the status of the services, such as numeric values representing, for example, the usage of a storage disk.

The attributes of a service can also be useful for defining specific conditions. For instance, the status of a superordinate service is only calculated if certain attributes of the service are set.

By applying aspects a) to d) specific subordinate services can be treated individually for the calculation of the superordinate service. This means that specific subordinate services can be weighted relative to other subordinate services.

Aspect d) allows the user to include specific external data in the status calculation rules. Since the rules can be programmed individually using any common programming language, it is possible to integrate into the rule an interface, for instance, to an external data base. Most preferably, this external data comprises time of the day information meaning that the result of the application of the rule depends on the time of the day.

The preferred embodiments provide various interfaces for configuring the rules. Preferably, the rules according to aspects b) and c) are configured using a graphical user interface in which predefined logical and arithmetical operations can be selected by the user to be applied to the status of subordinate services, messages or attributes. The configuration of rules according to aspect a) and d) is most preferably done by using an application programming interface to other programming languages providing the user with the greatest possible flexibility in defining the rules. Logical and arithmetical operations of aspect c) can of course be included while using this kind of interface. The programming languages applied to define the rules comprise both script programming languages and compiled programming languages such as C or $C^{++}$. The script or interpreter programming languages can be either a common language such as PERL or a language provided by the service management system defining a certain syntax. This kind of interface provides all the flexibility the syntax of the script programming language offers while being a user-friendly way to define complex rules.

Figure 5:
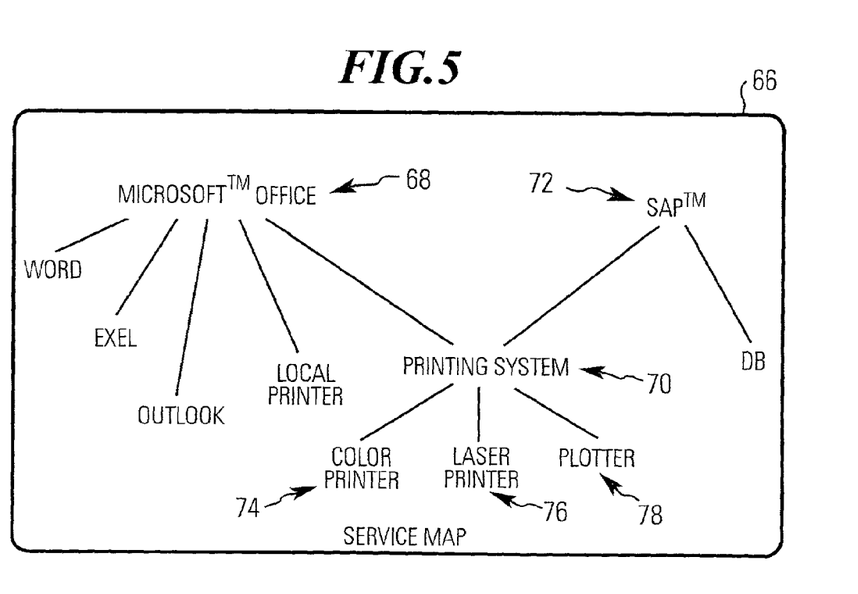
FIG. 5 shows an example of a service map.

In general, the relationship between services and components of services can have two different natures. In the simpler case, each superordinate service depends on various subordinate services and so on, whereas each subordinate service has only one relationship to a superordinate service. This special kind of network structure is called tree structure. An example of such a tree structure would be a Microsoft™ Office package comprising the applications Word, Excel, Outlook and a local printer as depicted in FIG. 5. In the more complex case of a so-called graph structure, a superordinate service can have more than one relationships to services of the next higher level. An example of such a graph structure would be a printing system within a network that performs printing jobs for Microsoft™ Office as well as for SAP™ applications as indicated in FIG. 5. In other words, in a tree structure any service has only one connection to the upper level whereas in a graph structure several connections to upper-level services are possible while both having one or more connections to lower-level services. In fact, the tree structure is a special case of the graph structure. The preferred embodiments are able to handle not only networks of services in the form of a tree structure, but also the more complex graph structure of relationships between the services.

The dependencies between the services of the IT network are most preferably visualized as graphical representation, for instance as a two-dimensional map, giving the user a clear view of the relations between the various services. In addition, the status and status changes of the services are visualized in such a two-dimensional map.

The preferred embodiments of the computer program product comprise a program code which, for example, is stored on a computer-readable data carrier or is in the form of signals transmitted over a computer network. The preferred embodiments of the program code are written in an object-oriented programming language, such as C++. Some of the components of the service management system also have a hardware part. For example, the storage component 34 of FIG. 2 comprises a physical storage medium for continuously storing the collected data. It is clear that a computer program product comprises only the software parts of these components.

FIG. 1 shows a high-level architecture of preferred embodiments of a service management system 2 and its components. Applications and services 22 such as SAP™ or Oracle™ within a managed IT environment are each monitored by individual agents 20. The services may be located on different platforms with different operating systems forming a heterogeneous environment. The agents 20 receive event notifications and collect performance data from the applications and services 22. They evaluate these event notifications and performance data according to instructions of policies 18 that are defined by a user via a graphical user interface (GUI) 4. As reaction, messages 16 are sent by the agents 20 to a service management server 12, and in particular, to a status engine 14 which is the main component of the service management system and is, for instance, running on the service management server 12. The service management server 12 stores the messages in a database 10, processes the content of the messages and sends the results to a navigator display 6 and a message browser 8. In the navigator display 6 a two-dimensional service map comprising the status of the individual services is shown. In the message browser 8 the most relevant messages are displayed and can be manipulated by the user. One purpose of the GUI 4 is to allow the user to edit rules for the status engine 14 on how to process the content of the messages 16.

Figure 2:
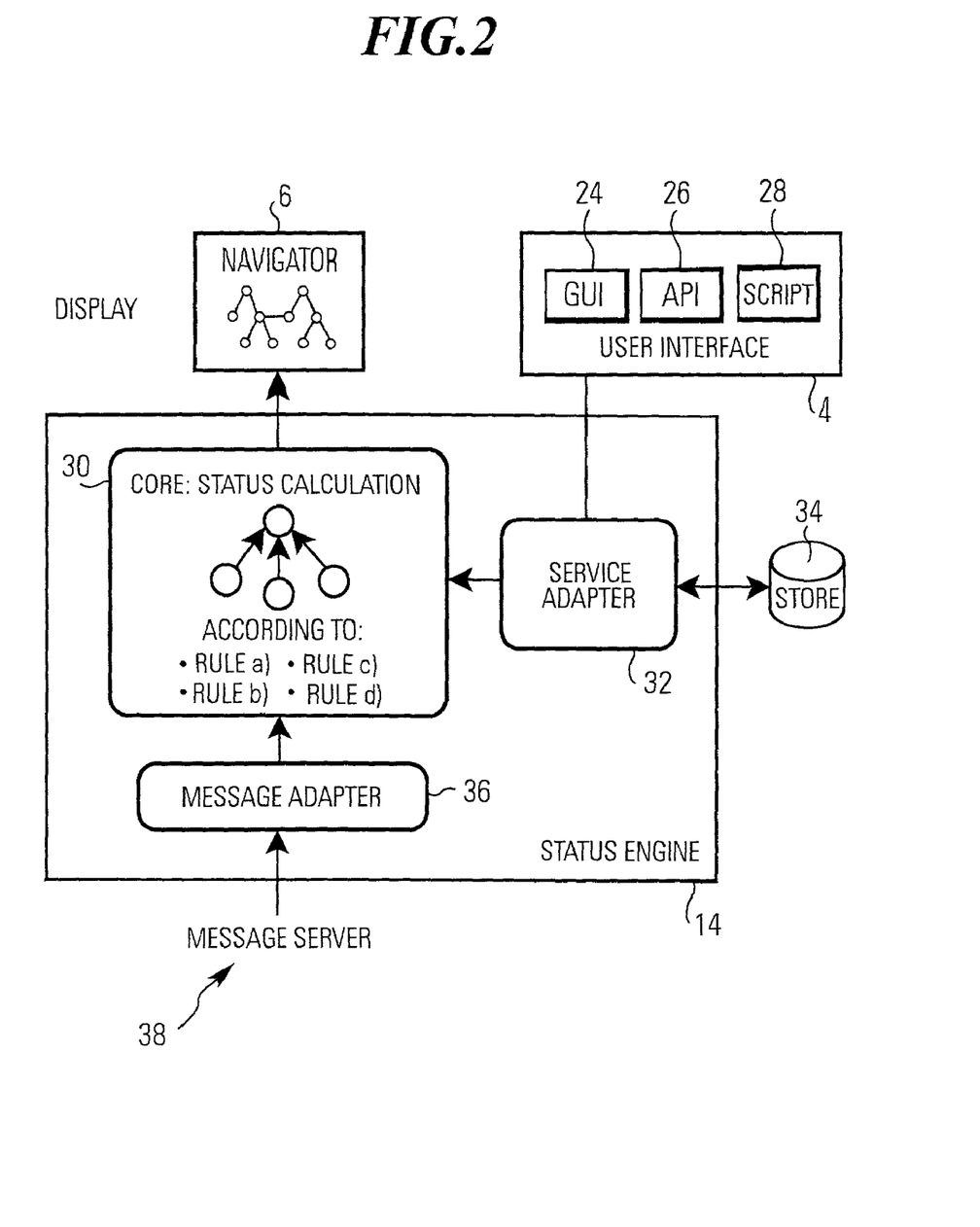
FIG. 2 shows schematically a status engine and its components.

FIG. 2 provides a closer view of the status engine 14 and its components. A message server 38, which is part of the service management server 12, is responsible for forwarding the messages created by the agents 20 to a message adapter 36. In the message adapter 36 the event notifications from a variety of messages are consolidated and passed to a core component 30 of the status engine where the severity information associated with the messages is used for the status calculation of the services. Using the severity information from the message adapter 36 the statuses of the various services are calculated in the core component 30 according to at least one, but most preferably to all of the rules of aspect a) to d). A service adapter 32 provides the core component 30 with information about the current service model including current services and their relation to each other, and provides the status calculation and propagation rules for the corresponding services and service components. The service model and the corresponding status calculation rules are stored in a database 34.

The status calculation rules and the service model are configured via the user interface 4. The preferred embodiments comprise three different ways for configuring the status calculation rules: a graphical user interface (GUI) 24 allowing the user to select and specify predefined rules, an application programming interface (API) 26 allowing any program code to be linked to the status calculation, and a script programming interface 28 allowing a predefined programming syntax to be used for the status calculation. The results of the status calculations are visualized in the navigator display 6 illustrating the status and the status changes of the services in a two-dimensional service map.

Figure 3:
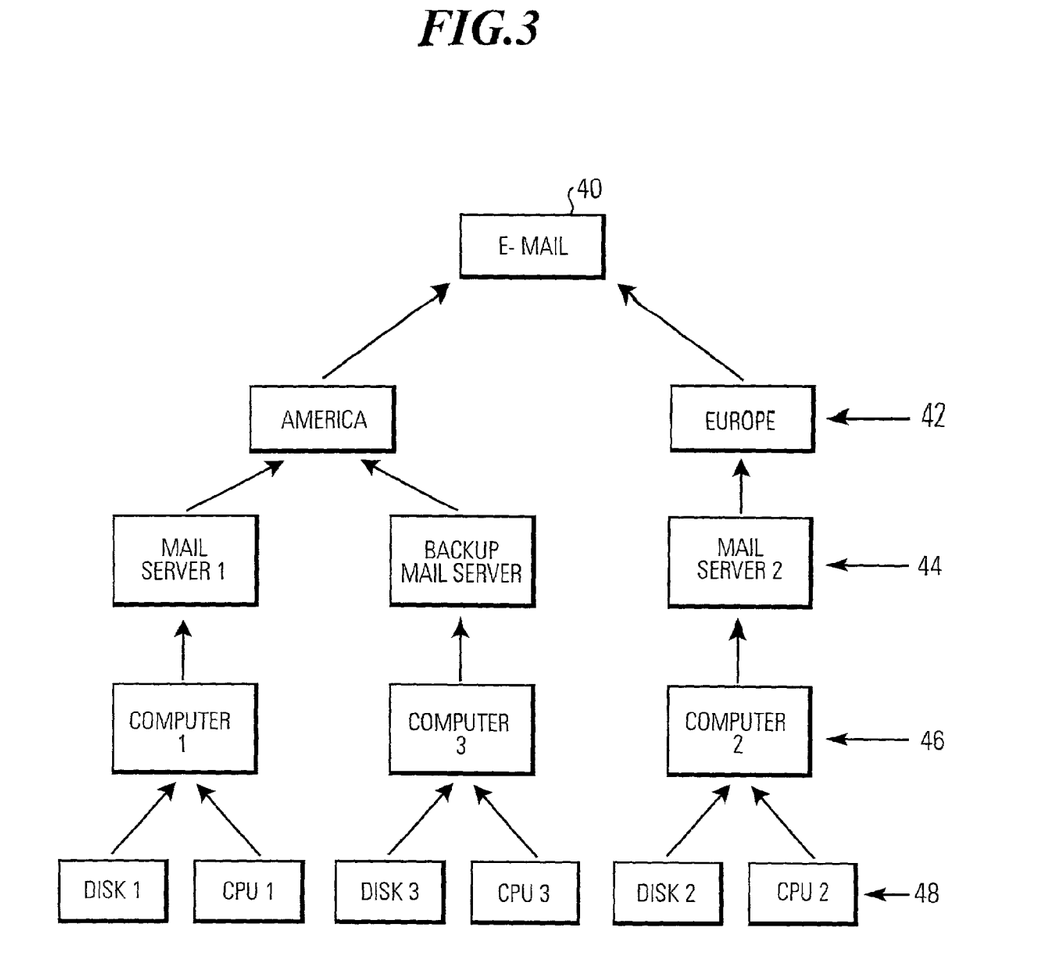
FIG. 3 schematically depicts a service hierarchy.

As an example for a service tree structure, FIG. 3 depicts a service hierarchy for an email service. The ordered dependency relationships between the services are illustrated by the arrows in the drawing. The top level service is e-mail 40. This service is dependent on two lower level services 42, America and Europe, which in this case represent e-mail services on two continents. These services are dependent on other services, such as e-mail servers 44 and computers 46, down to the lowest-level services 48.

Figure 4:
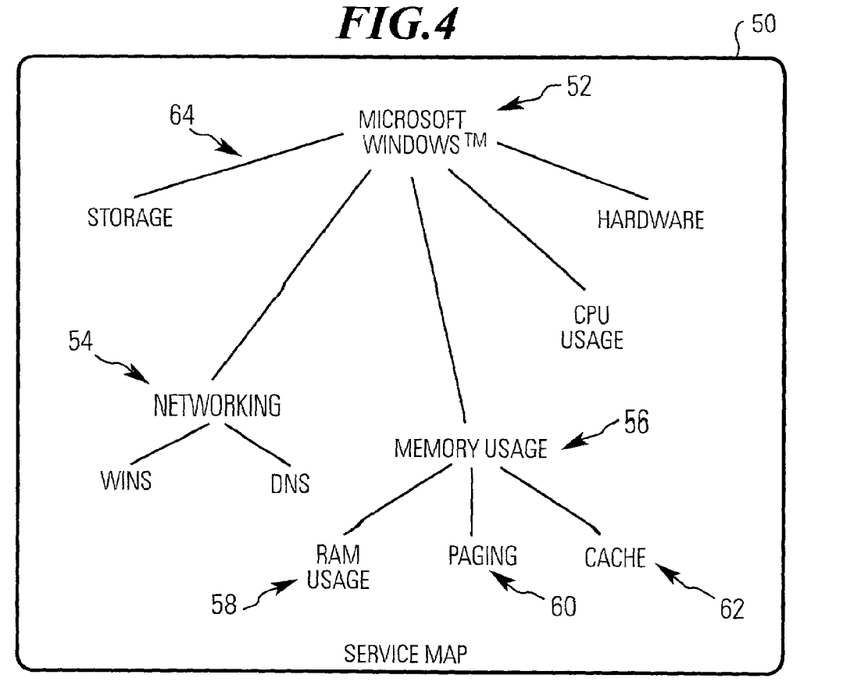
FIG. 4 shows an example of a service map.

FIG. 4 shows an other example for a service hierarchy in the form of a service tree structure as it is displayed in the preferred embodiments as a two-dimensional service map 50. As root service, in this case Microsoft Windows™ 52, is chosen which depends on other services such as networking 54, memory usage 56 and others. These services 54 and 56 are again superordinate services of other subordinate services on a lower level such as RAM usage 58, paging 60 and cache 62 in the case of the superordinate service memory usage 56. The dependency relations between superordinate and subordinate services are visualized by a line 64 connecting the corresponding services.

An example for a service network in the form of a graph structure is depicted in FIG. 5 as two-dimensional service map 66. The superordinate service Microsoft™ Office depends among others on a printing system 70 which again depends on other subordinate services such as a color printer 74, a laser printer 76, and a plotter 78. There is also another superordinate service SAP™ 72 with regard to the printing system 70. Therefore, the printing system 70 has two relations to superordinate services, which is the characteristic of a graph structure of services.

Figure 6:
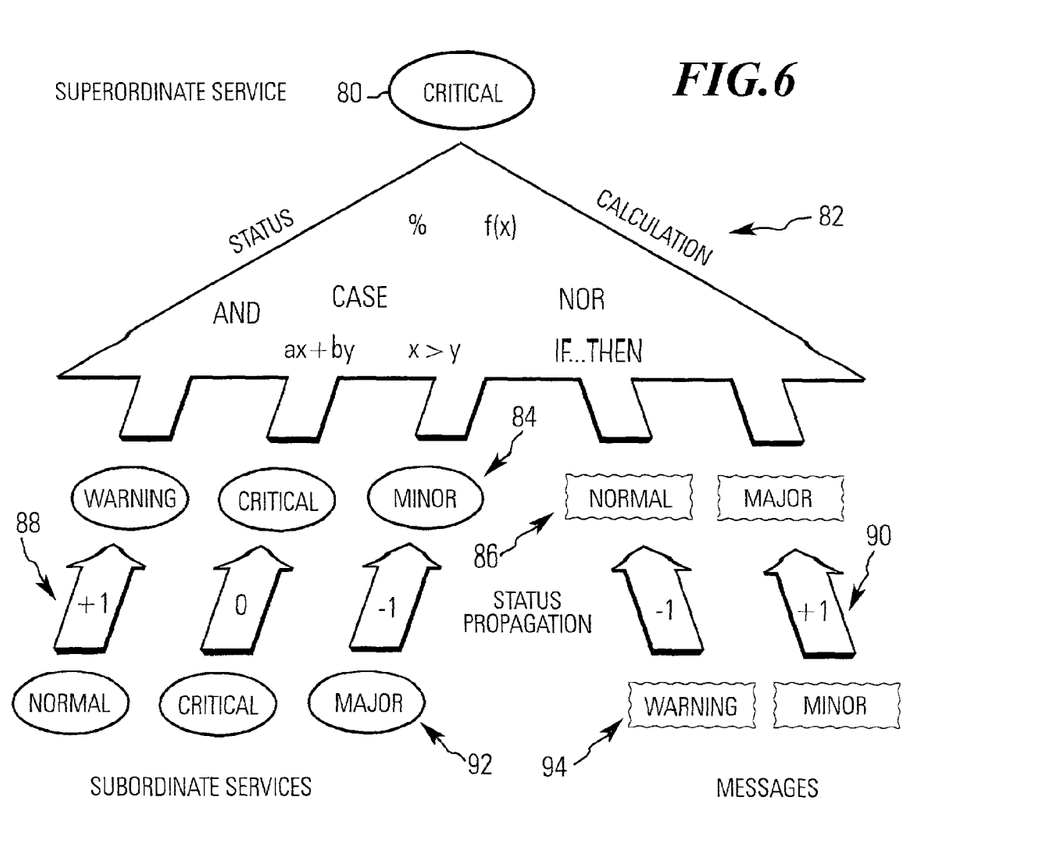
FIG. 6 illustrates schematically a status propagation and calculation.

FIG. 6 illustrates schematically a status propagation and calculation procedure for the preferred embodiments. The purpose of the procedure is to derive the status of a superordinate service 80 (in the depicted example the result is "critical") on the basis of the statuses of subordinate services 92 and the statuses of messages 94 directly concerning the status of the superordinate service 80 in question. In a first step, the severity of the statuses of the subordinate services 92 is increased, decreased, or unchanged according to the status propagation rules 88 for subordinate services. The purpose of the status propagation is to reflect the different importance of the subordinate services for the status of the superordinate service 80. Similarly, the severity of the messages 94 is propagated according to the status propagation rules for messages 90. The propagated severities of both the subordinate services 84 and the messages 86 are then combined in the status calculation 82 to determine the status of the superordinate service 80 according to at least one of the status calculation rules of the aspects a) to d).

Figure 7:
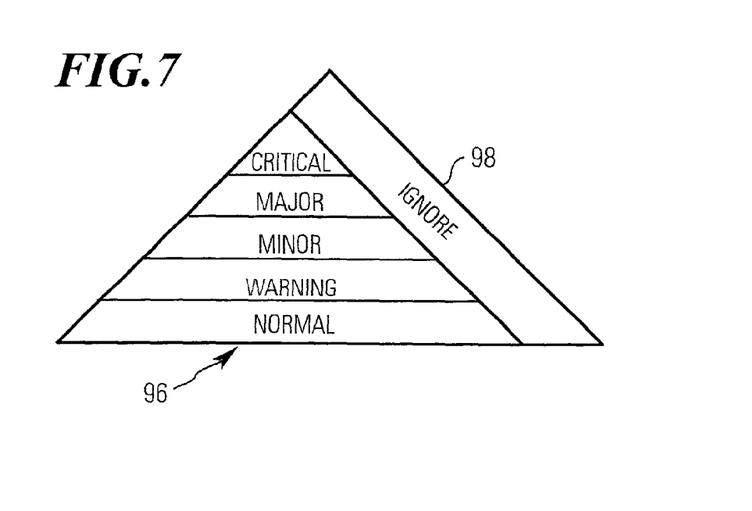
FIG. 7 illustrates an embodiment of aspect b) of the invention.

In the preferred embodiments possible severity levels 96 (FIG. 7) of a status of a service are in increasing order of severity "normal", "warning", "minor", "major" and "critical". An embodiment of aspect b) is illustrated in FIG. 7. As it is shown there, the status "ignore" 98 is additionally introduced in order to label a service that is not intended to contribute to the status calculation of the superordinate service. This feature is very useful for example in the case of a known outage of a service such as a scheduled maintenance. Although the administrator is informed about the outage of the service in question, error messages are created and sent to the status engine. In order to prevent such an expected event as a maintenance of a service from showing a "critical" status in the navigator display 6 or affecting the statuses of other services, the service can be excluded from the status calculation using the "ignore" status 98.

Figure 8:
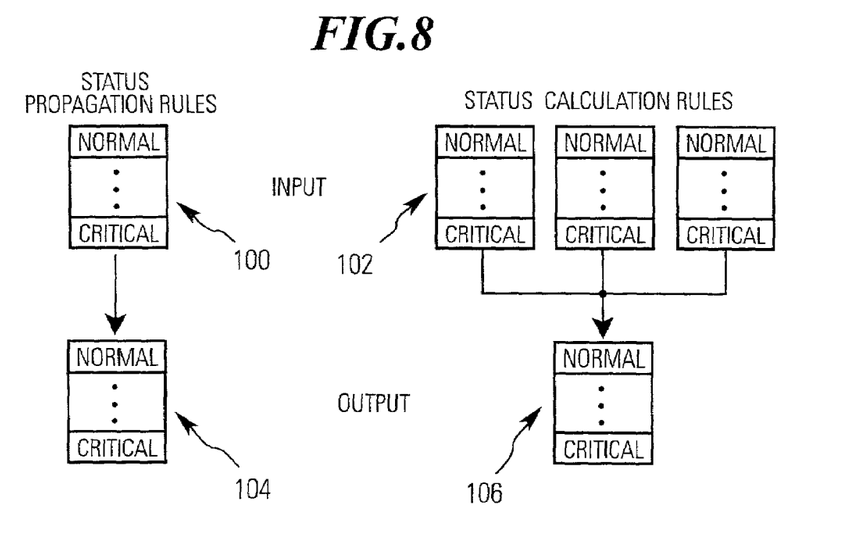
FIG. 8 illustrates the processing of statuses.

In FIG. 8 the general difference between status propagation rules and status calculation rules is schematically depicted for the preferred embodiments. While there is only one input parameter 100 for the status propagation rules, there are in general several parameters 102 that are included in the status calculation rules. In both cases, the parameters can take the severity values from "normal" to "critical" of FIG. 7. The output is generally only one value in both cases, i.e. the propagated status 104 according to the status propagation rules and the status of a superordinate service 106 according to the status calculation rules.

Figure 9:
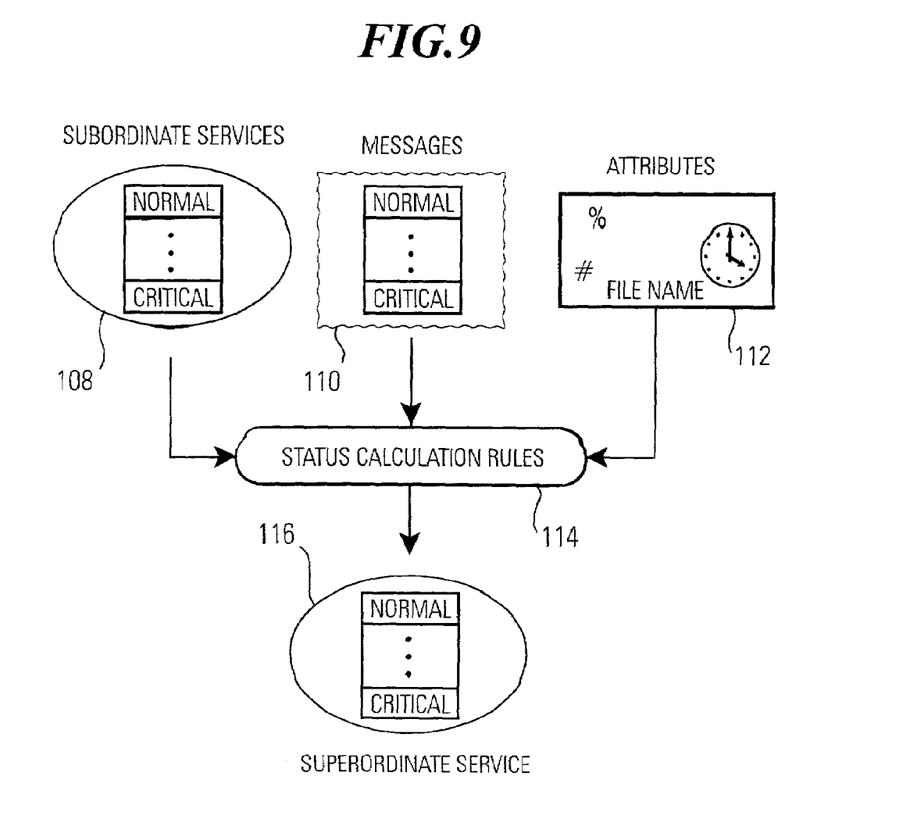
FIG. 9 displays the general processing of statuses according to status calculation rules, and in particular, an embodiment of aspect a) of the invention.

FIG. 9 visualizes the general processing for the calculation of the status of a superordinate service 116 and in particular a preferred embodiment according to aspect a) wherein additional attributes are used for the status calculation. The status calculation takes into account at least one of the following items of information: statuses of superordinate services 108, statuses of messages 110 directly influencing the superordinate service 116, and additional attributes 112 of subordinate services or the superordinate service 116 itself. While in the preferred embodiments the status of subordinate services and messages can have the severity levels from "normal" to "critical", the additional attributes 112 can have any value, for instance a time stamp, a file name, a counter value, a percentage, and so forth. On the basis of these input parameters, the status of the superordinate service 116 is calculated according to the status calculation rules 114. Examples of additional attributes are the usage of a storage disk in megabytes, a time of the day or a parameter indicating whether a service is in maintenance or not and are described in more detail in FIGS. 10 to 12.

Figure 10:
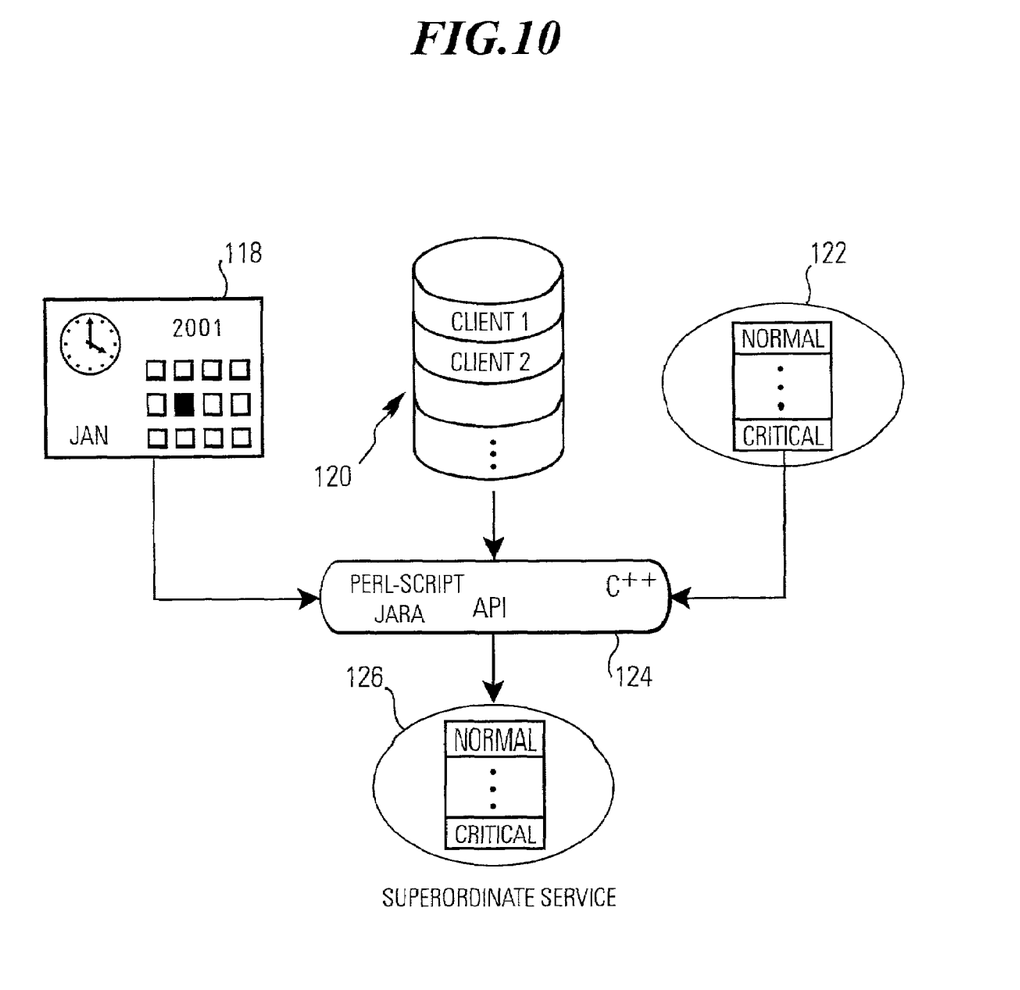
FIG. 10 illustrates an embodiment of aspect d) of the invention.

Another preferred embodiment is depicted in FIG. 10 showing the implementation of the status calculation of a superordinate service 126 using status calculation rules 124 that are individually programmed by a user according to aspect d) of the invention. In this case, not only the status of subordinate services or messages 122 can be included in the status calculation 124, but also external information, such as information coming from a client database 120 or specific time schedules 118. For example, it is possible that services for certain clients are given a higher priority and thus play a more important role in the status calculation. Or, the availability of, for instance, a Web server of a company offering Web services is more critical during certain periods of the day, e.g. in the evening when people come home from work and use this web service, or during special events such as the commercial slots of a popular football game. Using individually programmed rules, the occurrence of a server outage during these special time slots is treated as more critical than during the rest of the day. The user is free to define rules that suit special needs using any programming language such as C, C++, an interpreter or script programming language such as PERL, that are linked to the status engine via an application programming interface (API). In an other preferred embodiment a script programming language is provided by the service management system defining a special set of syntax elements to be used for configuring the rules.

Figure 11:
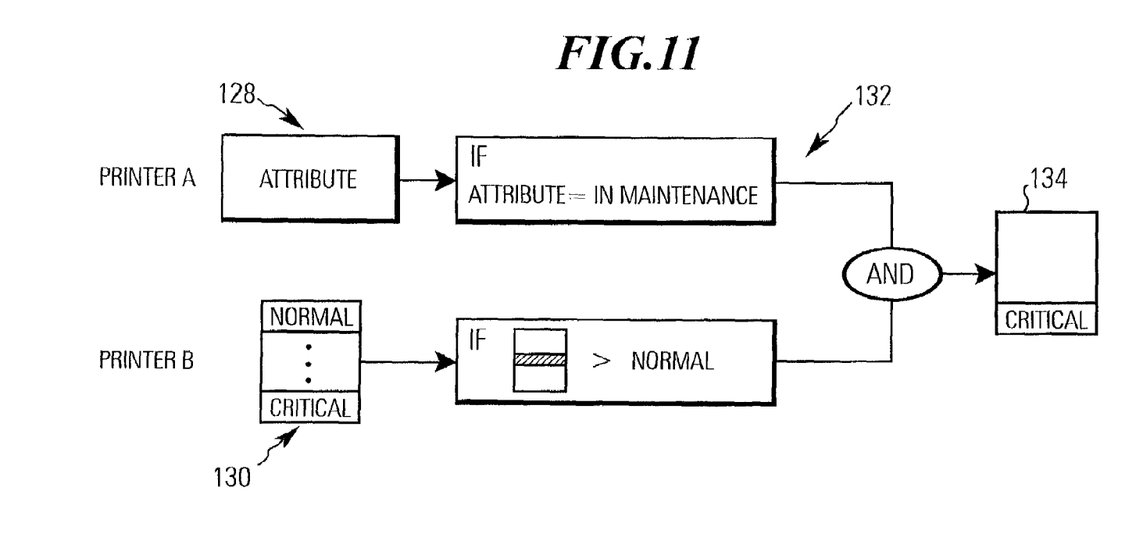
FIG. 11 illustrates an embodiment of aspect c) of the invention.

Another preferred embodiment of aspect c) using logical operations for the status calculation is shown in FIG. 11. As input for the calculation of the status of a superordinate service 134 two printers are assumed, printer A providing a maintenance attribute 128 and printer B providing its status 130 ranging from "normal" to "critical". An example of an implementation of a rule 132 using logical operations might be the following: if the attribute of printer A equals the value "in maintenance" AND if the severity level of printer B is higher than "normal", then the status of the superordinate service 134 is set to "critical". Other logical operators beside the AND operator that are implemented in preferred embodiments of aspect c) comprise the logical OR, NOT, NOR, and NAND operators. Aspect c) also comprises comparison operators such as GREATER THAN, EQUAL TO, LOWER THAN, etc. and operators expressing conditions such as IF "true/false" THEN, and iteration operators such as FOR i=1 to n.

Figure 12:
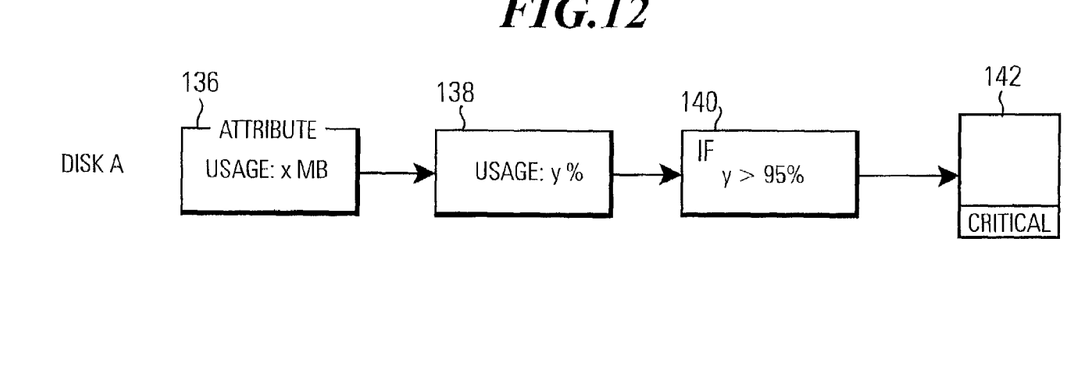
FIG. 12 illustrates an embodiment of aspect c) of the invention.

An example of a preferred embodiment of aspect c) using arithmetical operations for the calculation of the status of a superordinate service 142 is illustrated in FIG. 12. In this example the input parameter of the service "disk A" is an attribute indicating the current usage of disk space expressed in megabytes. In the first part 138 of the rule using arithmetical operations the relative usage expressed as a percentage is computed on the basis of the absolute value given in megabytes. The percentage value of disk usage is then used in the second part 140 of the rule stating: if the percentage of disk usage is greater than 95%, then the status of the superordinate service 142 is set to "critical". As in this example, a status calculation rule using arithmetical operations according to aspect c) is often applied in combination with additional attributes of the service other than the status according to aspect a). The arithmetical operations comprise, among others, basic operations such as addition, subtraction, multiplication, division, mathematical functions such as polynomial functions, exponential and logarithmic functions etc., differentiation and integration, and combinations of these. In addition, any combination of the above arithmetical and logical operations are included in aspect c) of the invention.

Generally, using the status calculation rules according to aspect a) to d) of the invention, a higher reliability and quality in monitoring services can be achieved because the status calculation rules can be adjusted more specifically and individually. For instance, owing to aspect a) of the invention, more information about a service and, in particular, more service specific performance data can be included in the status calculation leading to a more precise, specific and thus reliable image of the current status of the network of services. Excluding known error events form the status calculation according to aspect b) of the invention may help to avoid the distortion of the status information of the other services making those status evaluations more reliable. Aspect c) and d) of the invention allow to adapt the rules to specific performance data and specific requirements of the services improving the overall quality of the monitoring process.

Thus, a general purpose of the disclosed embodiments is to provide an improved method and computer system for evaluating the status of services of an information technology environment providing a greater flexibility in monitoring complex IT environments.

All publications and existing systems mentioned in this specification are herein incorporated by reference.

Although certain methods, systems and products constructed in accordance with the teachings of the invention have been described herein the scope of protection of this patent is not limited thereto. On the contrary, this patent covers all embodiments of the teachings of the invention fairly falling within the scope of the appended claims either literally or under the doctrine of equivalence.

What is claimed is:

1. A method carried out by a status engine for monitoring services of an information technology (IT) environment, comprising:

storing a representation of a service hierarchy, the stored representation comprising service elements representing the services of the IT environment, wherein each of the service elements has an associated status, the service hierarchy comprising superordinate and subordinate service elements;

calculating the status of a superordinate service element according to one or more rules, wherein the calculation depends on messages affecting the superordinate service element received from the IT environment, the status of at least one subordinate service element that is independently received from the messages, and additional attributes of the superordinate service element and/or the subordinate service elements, and wherein the rules define the dependency of the status of the superordinate service element on the statuses of the at least one subordinate service elements and a propagation of the statuses from the at least one subordinate service element to the superordinate service element, the rules comprising at least one of:

a rule that is based on additional attributes, other than the statuses, of the superordinate service element and/or the at least one subordinate service elements;

a rule that ignores one or more of the subordinate service elements;

a rule that is defined by a user on the basis of logical and/or arithmetical operations of the statuses or attributes of the at least one subordinate services elements; and a rule that is programmed individually by the user; and displaying monitoring results to the user.

2. The method of claim 1, wherein the rules, when the status of the superordinate service element is calculated, include:

status propagation rules that each have as an input only one parameter, wherein the parameter is a status of the at least one subordinate service element, and status calculation rules that have as an input one or more parameters selected from the group consisting of: the propagated status of the at least one subordinate service element, messages coming from services of the IT environment, and the additional attributes of the superordinate service element and/or the subordinate service elements.

3. The method of claim 1, wherein the additional attributes of the superordinate service element and/or the subordinate service elements can take values that are different from possible values of the status(es) of the superordinate service element and/or the subordinate service elements.

4. The method of claim 1, wherein specific subordinate service elements of the at least one subordinate service element are individually treated for the calculation of the status of the superordinate service element.

5. The method of claim 1, wherein user-specific external data is included in the rules.

6. The method of claim 1, wherein time of day information is included in the rules.

7. The method of claim 1, wherein the status of at least one of the service elements further depends on one or more messages coming from the services of the IT environment and affecting the status of the at least one of the service elements and wherein the rules further define the dependency of the status of the at least one of the service elements of the one or more messages.

8. A computer system for monitoring services of an information technology (IT) environment, wherein the computer system monitors the services based on a service hierarchy, wherein a stored representation of the service hierarchy includes service elements representing the services of the IT environment, wherein each of the service elements has an associated status, wherein the service elements include at least one superordinate service element and at least one subordinate service element, the system comprising:

a status engine for calculating the status of at least one of the service elements according to one or more rules, wherein the calculation depends on messages affecting the at least one service element received from the IT environment, the status of at least one service element that is independently received from the messages, and additional attributes of the superordinate service elements and/or the subordinate service elements:

a user interface for configuring the rules; and a graphical display for visualizing the monitoring results, wherein the rules define a dependency of the status of the at least one superordinate service element on the status of the at least one subordinate service element and a propagation of the status from the at least one subordinate service element to the at least one superordinate service element, and wherein the rules include at least one of:

a) a rule that is based on additional attributes, other than the status, of at least one of the service elements;

b) a rule that ignores the at least one subordinate services element;

c) a rule that is defined by a user on the basis of logical and/or arithmetical operations of the status or the additional attributes of the at least one subordinate services element; and d) a rule that is programmed individually by the user.

9. The computer system of claim 8, wherein the user interface for configuring the rules is a graphical user interface.

10. The computer system of claim 8, wherein the user interface for configuring the rules is an application programming interface to other programming languages.

11. The computer system of claim 8, wherein the user interface for configuring the rules is a script programming language of which a syntax is provided by the status engine.

12. The computer system of claim 8, wherein the status engine is capable of handling a graph structure of the IT network of services in which each of the services can have one or more depending services and one or more services on which each of the services depends.

13. The computer system of claim 8, wherein the dependencies between the services of the IT environment are visualized as a graphical representation.

14. The computer system of claim 13, wherein the statuses and status changes of the service elements are visualized in a graphical representation.

15. The computer system of claim 8, wherein the status of at least one of the service elements further depends on one or more messages coming from the services of the IT environment and affecting the status of the at least one of the service elements and wherein the rules further define the dependency of the status of the at least one of the service elements of the one or more messages.

16. A computer program product including program code tangibly embodied on a computer readable medium which, when executed on a computer system, causes a status engine to monitor services within an information technology (IT) environment, the monitoring comprising:

storing a representation of a service hierarchy, wherein the stored representation includes service elements representing the services of the IT environment, wherein each of the service elements has an associated status, wherein the service hierarchy includes at least one superordinate service element and at least on subordinate service element, calculating the status of the at least one superordinate service element according to one or more rules, wherein the calculation depends on messages affecting the at least one superordinate service element received from the IT environment, the status of the at least one subordinate service element that is independently received from the messages, and additional attributes of the at least one superordinate service element and/or the at least one subordinate service elements;

wherein the rules define the dependency of the status of the at least one superordinate service element on the status of the at least one subordinate service element and a propagation of the status from the at least one subordinate service element to the at least one superordinate service element, and wherein the rules include at least one of:

a) a rule that is based on additional attributes, other than the status, of at least one of the service elements;

b) a rule that ignores the at least one subordinate services element;

c) a rule that is defined by a user on the basis of logical and/or arithmetical operations of the status or the additional attributes of the at least one subordinate services element; and d) a rule that is programmed individually by the user; and displaying monitoring results to the user.

17. The computer program product of claim 16, further comprising providing an interface to the user for configuring the rules.

18. The computer program product of claim 17, wherein the interface for configuring the rules is a graphical user interface.

19. The computer program product of claim 17, wherein the interface for configuring the rules is an application programming interface to other programming languages.

20. The computer program product of claim 17, wherein the interface for configuring the rules is a script programming language of which syntax is provided by the status engine.

21. The computer program of claim 16, wherein the status of at least one of the service elements further depends on one or more messages coming from the services of the IT environment and affecting the status of the at least one of the service elements and wherein the rules further define the dependency of the status of the at least one of the service elements of the one or more messages.

* * * * *